2,943,413

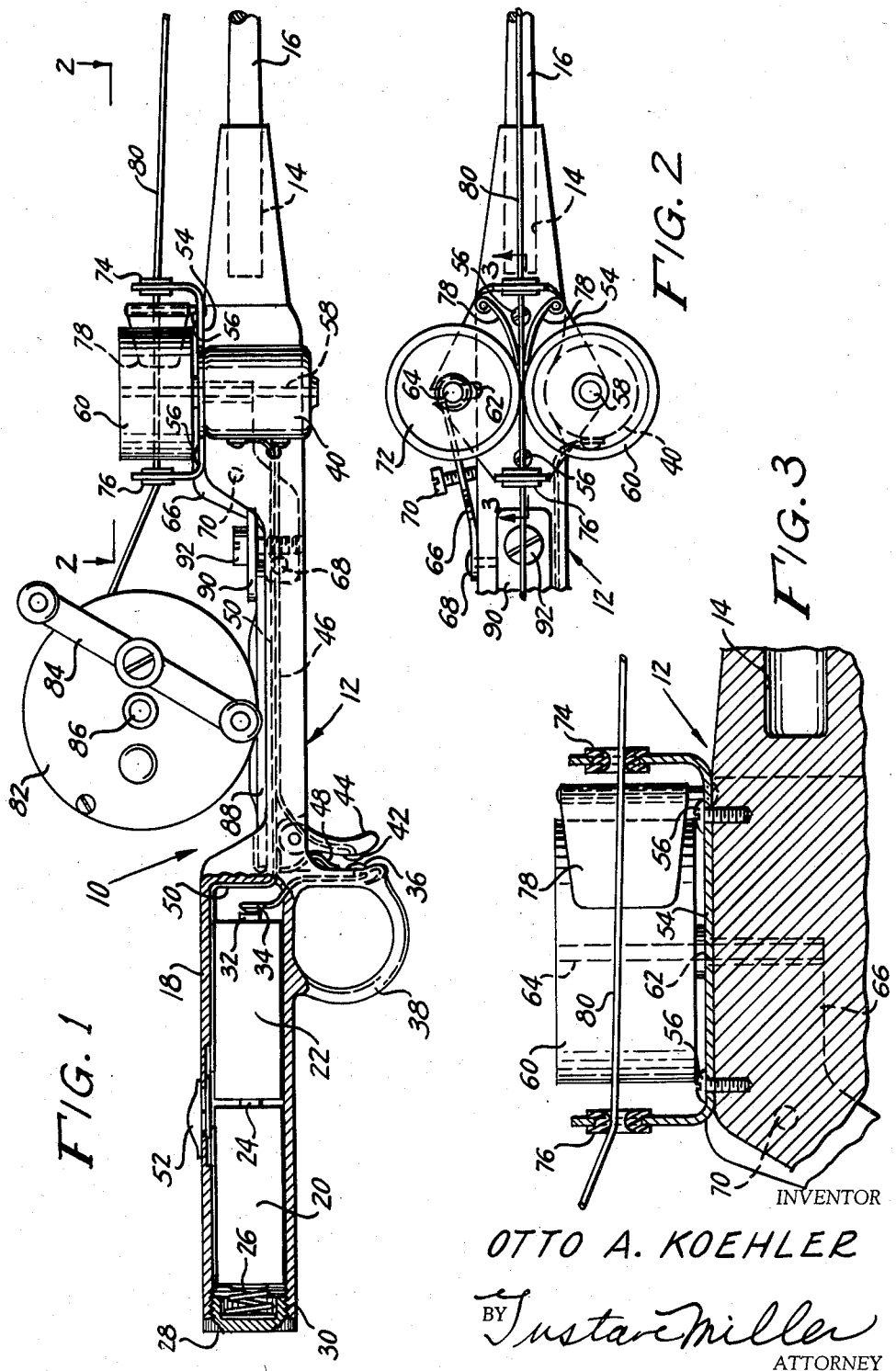
July 5, 1960  O. A. KOEHLER  2,943,413
FISHING ROD AND REEL ASSEMBLY
Filed March 25, 1958
INVENTOR
OTTO A. KOEHLER
BY Gustav Miller
ATTORNEY

FISHING ROD AND REEL ASSEMBLY

Otto A. Koehler, P.O. Box 1661, San Antonio 6, Tex.

Filed Mar. 25, 1958, Ser. No. 723,809

14 Claims. (Cl. 43—21)

This invention relates to a fishing apparatus, and it particularly relates to a fishing rod and reel of an improved type.

Heretofore, fishing rods, whether hand operated or power-driven, have all been faced with the problem of backlash after a cast is made. To control this backlash, they have generally provided friction devices on the rod, these devices acting to apply friction on the drum of the reel. Although this friction did effectively control the backlash, it materially reduced the length of the cast. This reduction of the length of the cast became an inherent defect which, up till now, fishermen were forced to live with.

It is one object of the present invention to overcome the above disadvantages of ordinary fishing rods by providing a fishing rod and reel assembly wherein not only is backlash avoided but where the length of the cast is increased.

Another object of the present invention is to provide an improved fishing rod and reel assembly which is relatively simple in construction and easy to use.

Other objects of the present invention are to provide an improved fishing rod and reel assembly, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a fragmentary, side view, partly in elevation and partly in section, of a rod and reel assembly embodying the present invention.

Fig. 2 is a fragmentary top plan view taken on line 2—2 of Fig. 1.

Fig. 3 is a fragmentary sectional view taken on line 3—3 of Fig. 2.

Referring now in greater detail to the drawing wherein similar reference characters refer to similar parts, there is shown an assembly, generally designated 10, which comprises a handle portion generally designated 12 having a socket 14 at one end to receive the rod 16, the rod 16 being of the ordinary fishing rod type in standard use. At the opposite end, the handle 12 is provided with an extension housing 18 within which are adapted to be positioned a pair of end-to-end aligned batteries 20 and 22, as in an ordinary flashlight housing.

The contact 24 of battery 20 is held against the contact of battery 22 by a spring 26 attached to a removable plug 28 which is screw-threaded in place within the corresponding open end of the housing 18, as at 30. When this aligned position is provided, the contact 32 abuts against a spring contact 34. This spring contact 34 is connected to a contact button 36 on a finger ring 38 and is adapted to establish one part of an electrical circuit between contact 32 and an electric motor 40 at the opposite end of the handle 12 when it is in abutment with a contact button 42 on a trigger 44; the button 42 being elecrically connected to motor 40 through a line 46. A leaf spring 48 extends down from the handle 12 and acts to bias the trigger 44 away from ring 38, as shown in Fig. 1.

The other part of the circuit between the batteries and the motor 40 is provided by a line 50 which extends from the motor 40 through the handle 12, into the housing 18 and into connection with a master switch 52 on the housing 18, this switch 52 being adapted to contact the batteries in a manner similar to that of the ordinary flashlight arrangement.

The motor 40 is mounted on and depends from a plate 54 which is itself attached to the handle 12 by a pair of screws 56. The plate 54 is of generally quadrangular configuration with the motor 40 connected to one lateral apex thereof. Through this apex extends the motor shaft 58 to which is connected a driven roller 60. At the opposite apex of the plate 54 is a slot 62 through which extends a shaft 64. The lower portion of shaft 64, below plate 54, is engaged by one end of a spring arm 66, the other end of which is connected to the handle 12 by a screw 68. The tension of this spring arm 66 is adjustable by means of a set-screw 70 extending transversely therethrough. By adjustment of the tension of arm 66 by means of screw 70, the shaft 64 is adjusted within slot 62 whereby the idler roller 72 mounted on shaft 64 above plate 54, is adjusted toward or away from driven roller 60. Roller 72 is preferably constructed of plastic or cork.

At the forward and rearward apices of the plate 54, the plate is bent upwardly and is provided with a guide ring, as at 74 and 76. Immediately to the rear of guide ring 74 there are provided a pair of oppositely-curved, inwardly-inclined scraper springs 78, these scrapers being inclined inwardly toward the rear to provide a narrow passage at the rear for the fishing line 80 which passes through guide ring 74, then between the scraper springs 78, then through guide ring 76 and finally onto a reel 82. The scraper springs 78 are preferably constructed of plastic material. As the line 80 passes between the scrapers 78, any undesirable adherents picked up in the water are removed before the line passes over the reel 82.

The reel 82, provided with an operating handle 84, is rotatable around a shaft 86 which is rotatably mounted on a supporting plate 88 releasably held in position on the handle 12 by means of a clamping plate 90 which is, in turn, held in position by a screw 92.

Although the motor 40 is disclosed on the drawing as being electrically powered from the batteries 20 and 22, it may obviously be powered by other means, such as coil spring that may be manually wound up as by a manual crank or winding handle, and held in wound position by a release ratchet connected to the trigger 44, so that manual pressure on trigger 44 releases the spring to power the motor and rotate the roller 60.

In operation, when it is desired to make a cast, the master switch 52 is closed and the handle 12 is held in position to make the cast. As the cast is made, the trigger 44 is pulled back against the bias of spring 48. This closes the circuit between the batteries and the electric motor 40, or releases the ratchet to the spring wound motor so that the motor actuates the motor shaft 58 to rotate the roller 60. The roller 60, acting through fishing line 80, rotates the idler roller 72 while, at the same time, giving an added impetus to the forward movement of the fishing line. This additional force exerted by the rollers prevents the formation of backlash and also acts to increase the length of the cast because of the added momentum furnished thereby. This is in direct contrast with ordinary friction devices which decrease rather than increase the momentum of the fishing line during the cast. After a catch is made or at any other time when it is desired to reel in the line, this is accomplished in the ordinary manner of rotating the reel 82 by means of its handle 84.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishing rod and reel assembly comprising a handle, a rod connected to one end of the handle, a battery housing in the opposite end of the handle containing batteries, an electric motor on the handle, an electric circuit connecting said motor to the batteries in said housing, switch means for interrupting or completing said circuit, roller means operatively connected to said motor, said roller means being drivingly engaged with a fishing line positioned on said rod, said fishing line being longitudinally movable relative to said rod and said handle and being connected to a reel on said handle independent of said motor, said reel being connected to said motor solely through said fishing line.

2. The assembly of claim 1, said switch means comprising a master switch for selectively maintaining said circuit in either completed or interrupted condition, and a trigger switch, normally biased to interrupted circuit condition for completing the circuit to operate the motor only while said master switch is in circuit completing position.

3. The assembly of claim 2, said trigger switch comprising a finger ring depending from said handle behind the reel positioned on said handle, a circuit contact mounted on said finger ring, a trigger pivoted on said handle forwardly of said finger ring, a circuit contact mounted on said trigger arranged to contact said finger ring contact when said trigger is pivoted thereagainst, and spring means normally biasing said trigger contact away from said finger ring contact, whereby said finger ring and said trigger facilitate gripping said handle at all times, but can control the motor operation only while said master switch is in circuit completing position.

4. The assembly of claim 1 wherein said roller means comprises a driven roller mounted on the shaft of said motor, and an idler roller in opposed relationship to said driven roller, said fishing line passing between said rollers.

5. The assembly of claim 4 wherein said idler roller is mounted on a shaft which is radially adjustable toward and away from said driven roller.

6. The assembly of claim 5 wherein said idler roller is adjustable by means of a spring arm having one end in engagement with the shaft of said idler roller and its opposite end connected to said handle, and a set-screw in operative engagement with said spring arm to vary the tension of said spring arm.

7. The assembly of claim 1 wherein scraper means for opposite sides of said fishing line are provided adjacent the path of movement of said fishing line.

8. A fishing rod and reel assembly comprising a handle, a rod connected to said handle, a rotatable reel on said handle, a fishing line movably extending from said reel over said rod, roller means on said handle, and means for positively driving said roller means, said reel being connected to said driving means solely through said fishing line.

9. The assembly of claim 8, said means for driving said roller means comprising an electric motor, said electric motor being electrically connected to a source of electric energy, and switch means to electrically connect and disconnect said motor from said source.

10. The assembly of claim 9, said switch means comprising a master switch for selectively maintaining the electrical circuit to the electric motor in connected or in disconnected position, and a trigger switch, normally biased to disconnected position, for electrically connecting said motor to said electrical source only while said master switch is maintained in electrically connecting position.

11. The assembly of claim 10, said trigger switch comprising a finger ring depending from said handle behind the reel positioned on said handle, a circuit contact mounted on said finger ring, a trigger pivoted on said handle forwardly of said finger ring, an electrical contact mounted on said trigger arranged to contact said finger ring contact when said trigger is pivoted thereagainst, and spring means normally biasing said trigger contact away from said finger ring contact, whereby said finger ring and said trigger facilitate gripping said handle at all times, but can control the motor operation only while said master switch is in electrically connecting position.

12. The assembly of claim 8 wherein guide means are provided on said handle adjacent said roller means.

13. The assembly of claim 9 wherein scraper means for opposite sides of said fishing line are interposed in the path of said fishing line.

14. The assembly of claim 8 wherein said roller means are operatively connected to a motor, said motor being connected to a source of energy, and means to connect and disconnect said motor from said source.

References Cited in the file of this patent

UNITED STATES PATENTS

| | | |
|---|---|---|
| 2,190,398 | Bugatti | Feb. 13, 1940 |
| 2,197,675 | Babcock | Apr. 16, 1940 |
| 2,230,940 | Ellsworth | Feb. 4, 1941 |
| 2,470,507 | Luton et al. | May 17, 1949 |
| 2,576,629 | Morby | Nov. 27, 1951 |